United States Patent
Weber et al.

(10) Patent No.: US 6,616,429 B1
(45) Date of Patent: Sep. 9, 2003

(54) APPARATUS AND METHOD FOR ALIGNMENT OF THE BEARING OF THE CRANKSHAFT OF A SCROLL COMPRESSOR AND A SCROLL COMPRESSOR AND DEVICE FOR CARRYING OUT THIS METHOD

(75) Inventors: Jean-Francois Weber, Lyons (FR); Jean-Michel Pfister, Millery (FR); Pierre Ginies, Sathonay Village (FR)

(73) Assignee: Danfoss Maneurop S.A., Trevoux (FR)

( * ) Notice: Subject to any disclaimer, the term of this patent is extended or adjusted under 35 U.S.C. 154(b) by 0 days.

(21) Appl. No.: 09/958,792

(22) Filed: Oct. 15, 2001

(30) Foreign Application Priority Data

Apr. 20, 1999 (FR) .............................. 99 05146

(51) Int. Cl.⁷ ................................................ F01C 1/02
(52) U.S. Cl. .................................. 418/55.1; 29/888.022
(58) Field of Search ...................... 418/55.1; 29/281.5, 29/888.02; 269/287, 43

(56) References Cited

U.S. PATENT DOCUMENTS

| | | | |
|---|---|---|---|
| 4,706,353 A | 11/1987 | Zgliczynski et al. | 29/156.4 |
| 5,042,150 A * | 8/1991 | Fraser, Jr. | 29/464 |
| 5,328,340 A | 7/1994 | Hara et al. | 418/55.1 |
| 5,382,143 A | 1/1995 | Nakamura et al. | 418/55.1 |
| 5,549,466 A * | 8/1996 | Hori et al. | 29/888.022 |
| 5,564,186 A | 10/1996 | Hori et al. | 29/888.22 |
| 5,661,894 A * | 9/1997 | Kawasaki et al. | 29/256 |
| 5,842,271 A * | 12/1998 | Kawasaki et al. | 29/732 |

FOREIGN PATENT DOCUMENTS

| | | | | |
|---|---|---|---|---|
| EP | 0 432 083 B1 | | 8/1993 | F04C/18/02 |
| JP | 04175484 A | * | 6/1992 | F04C/18/02 |
| JP | 06221280 A | * | 8/1994 | F04C/18/02 |

* cited by examiner

Primary Examiner—Thomas Denion
Assistant Examiner—Theresa Trieu
(74) Attorney, Agent, or Firm—McCormick, Paulding & Huber LLP

(57) ABSTRACT

This method comprises carrying out the mounting of the body of the compressor and of the compression elements in the casing of the compressor, with the body or fixed scroll bearing on one end of the shroud of the casing, and then welding a cap to the shroud, the crankshaft being engaged in a bearing belonging to the movable part of the compression stage and in a bearing belonging to the body, engaging on the free end of the crankshaft a bearing mounted in a support, itself mounted with radial play in the shroud, with the possibility of being fastened to the latter, displacing the free end of the crankshaft in a plurality of directions perpendicular to its axis, in order to take into account the plays of the bearing mounted in the body, then determining the axis of the bearing on the basis of the various displacements, positioning the bearing and/or its support as a function of this axis, and fastening the support to the casing of the compressor or the bearing on its support.

25 Claims, 9 Drawing Sheets

APPARATUS AND METHOD FOR ALIGNMENT OF THE BEARING OF THE CRANKSHAFT OF A SCROLL COMPRESSOR AND A SCROLL COMPRESSOR AND DEVICE FOR CARRYING OUT THIS METHOD

CROSS REFERENCE TO RELATED APPLICATIONS

This application is entitled to the benefit of, and incorporates by reference essential subject matter disclosed in PCT Application No. WO 00/63560 filed on Apr. 19, 2000 and French Patent Application No. 99/05146 filed on Apr. 20, 1999.

FIELD OF THE INVENTION

The present invention relates to a method for mounting and aligning the bearings of the crankshaft of a scroll compressor, to a device for carrying out this method and to a scroll compressor obtained by means of this method.

BACKGROUND OF THE INVENTION

A scroll compressor is illustrated in longitudinal section in FIG. 1. This compressor comprises a hermetic casing 2, within which are formed a suction chamber 3 provided with an inlet 4 for the gas, and a delivery chamber 5, or pressure chamber, provided with an outlet 6 for the gas.

The suction chamber 3 and delivery chamber 5 are separated by a separating wall 7. Within the suction chamber 3 is mounted an electric motor, the stator 8 and rotor 9 of which are illustrated in the drawing. The rotor 9 is associated with a shaft 10, forming a crankshaft, guided in a lower bearing 12 and in an upper bearing 13 mounted inside the body 14 of the compressor.

The pump intended for ensuring the rise in pressure of the gas consists of two volutes, a fixed volute 15 belonging to the separating wall 7 and a movable volute 16 driven by the end of the crankshaft, this end being eccentric with respect to the crankshaft axis centred on the bearings 12 and 13. This end of the crankshaft is mounted in the rotary part of the compressor by means of a bearing 17. During the orbital movement of the movable part with respect to the fixed part of the compressor, the volume of the pockets in which the gas is trapped decreases, in such a way that the gas is compressed, before escaping via an outlet port 18, on which is mounted a delivery valve 19 allowing compressed gas to pass towards the pressure chamber 5 and preventing gas from passing from this same chamber towards the suction chamber, from the moment when the machine stops.

It should be noted that it is important to ensure that there is exact alignment of the bearings 12 and 13 of the crankshaft and to position the lower bearing axially in order to ensure functional plays between the top of the crankshaft 10 and the end of the bearing driving the movable volute 16 of the scroll and between a counterweight 39 (FIG. 2) integral with the crankshaft 10 and the body 14, on the one hand, and the base of the movable volute 16 of the scroll, on the other hand.

The problem presented can be solved without much difficulty if the stator is mounted in a tube which is itself mounted inside the body of the compressor.

The problem still exists, however, if the stator is inserted directly into the shroud of the compressor, since, in such a case, the geometry of the machine is governed by the casing formed by the shroud.

In some compressors, then, this geometry is liable to change during the manufacture of the compressor. This applies particularly if the body of the compressor comes to bear on the shroud forming the body, and if the body is closed by means of a cap which is welded to the shroud in the vicinity of the bearing face of the body on the shroud. This weld typically deforms the shroud and changes the references.

In such a case, it is expedient to have the possibility of carrying out the alignment of the bearings of the crankshaft, in particular of the bearing for mounting the crankshaft in the body and of the bearing for mounting the crankshaft in the region of the motor, after this weld has been made.

The general object of the invention is to provide a method and a device making it possible to carry out such alignment.

SUMMARY OF THE INVENTION

For this purpose, the method to which it relates comprises:

mounting the body of the compressor and the compression elements in the casing of the compressor, with the body or fixed scroll bearing on one end of the shroud of the casing, and then welding a cap to the shroud, the crankshaft being previously or subsequently engaged in a bearing belonging to the movable part of the compression stage and in a bearing belonging to the body, the crankshaft likewise having to be mounted in a lower bearing, itself mounted in a support intended to be fastened to the casing of the compressor, displacing the free end of the crankshaft in a plurality of directions perpendicular to its axis, in order to take into account the play of the bearing mounted in the body, and then determining the axis of the lower bearing on the basis of the various displacements, positioning the bearing as a function of this axis, and fastening the support equipped with the bearing to the casing of the compressor or fastening the bearing to its support previously fastened to the casing of the compressor.

Advantageously, this method involves aligning the bearings when the crankshaft is in a position such that the displacement of the crankshaft in a plane substantially perpendicular to the two parallel planes delimited by the sealing lines between the fixed and movable volutes of the scroll, are parallel to the axis of the crankshaft.

According to one embodiment of the invention, the fastening of the support to the shroud is carried out by welding.

In addition, the support of the bearing comprise at least three radial branches.

According to another configuration, with the compressor being positioned vertically "upside down", this method involves engaging the lower bearing on the crankshaft, exerting a pull on the crankshaft in order to suspend it by a predetermined value, positioning a measuring device, such as a comparator, fastened to a fixed part, such as the casing of the compressor or a support, and bringing the measuring device to bear against the bearing or a piece integral with the bearing, the axis of symmetry of the counterweight of the rotor being approximately perpendicular to a first direction of radial displacement of the bearing. The middle of the stroke in this direction is determined by imparting a to-and-fro movement to the crankshaft, then carrying out the same operation in at least one other direction. The axis of the bearing being obtained by taking into account half the axial stroke along the various directions of displacement.

According to a second possibility, with action being taken on the free end of the crankshaft, the method comprises causing the crankshaft to inscribe a closed or quasi-closed curve by applying a radial force rotating through 360° on the end of the crankshaft. This causes the crankshaft to come to bear against the bearing mounted in the body. The centre of gravity of the curve is then determined and the axis of the lower bearing is keyed on this point before fastening to the casing. Advantageously, in such a case, the method comprises causing the crankshaft to rotate about its axis at the same time as the radial force rotating through 360° is applied.

Different embodiments of the method are possible.

According to a first embodiment, the method comprises, before the displacement of the crankshaft in order to determine the axis of the lower bearing, engaging on this free end a bearing mounted with a suitable fit in a support, itself mounted with radial play in the shroud with the possibility of being fastened to the latter.

According to a second embodiment, the method comprises determining the axis of the lower bearing by the displacement of the free end of the crankshaft in a plurality of directions perpendicular to its axis, then engaging on the free end of the crankshaft a bearing mounted in a support, itself mounted with radial play in the shroud with the possibility of being fastened to the latter.

According to a third embodiment, the method comprises fastening the bearing support in the casing of the compressor, taking into account the desired distance between the end of the shroud serving for the bearing contact of the body and the support, then, after mounting in the casing of the compressor the various component elements of the latter, carrying out the alignment of the lower bearing with the upper bearing by displacing the bearing within an orifice of larger area which the support comprises, and, after carrying out this alignment, fastening the bearing to its support.

The invention also relates to a device for carrying out the method comprising:
 a stand intended for receiving the compressor, and
 a mechanism for holding the free end of the crankshaft.

According to one embodiment, this device comprises:
 a stand intended for receiving the compressor, the free end of the crankshaft facing outwards,
 a table arranged at the end of the stand and comprising two parallel plates associated with means for displacement and for measuring the displacement in two perpendicular directions,
 pieces fixed to the plate nearest the compressor and intended for fastening the branches of the lower-bearing support, and
 a cap for holding the free end of the crankshaft, the said cap being driven in a longitudinal movement in order to set the axial position of the crankshaft.

The invention also relates to a scroll compressor comprising a casing consisting of a shroud, within which are mounted the body of the compressor and compression elements, with the body or the fixed part of the scroll bearing on one end of the shroud before the latter is closed by the welding of a cap, the crankshaft which drives the movable part of the scroll being engaged in a bearing belonging to the movable part of the compression stage, in a bearing belonging to the body and in a lower bearing, characterized in that the lower bearing is equipped with means for setting its alignment with the bearing belonging to the body.

According to a first embodiment, the bearing is mounted with a suitable fit in a support, and the support is mounted with radial play in the shroud of the casing, and is equipped with means for positioning, for example by screws, before fastening by welding.

According to a second embodiment, the bearing is mounted with radial play in a support, with blocking in the alignment position, for example by screwing, the support being itself of a size fitting that of the interior of the shroud of the casing and being fastened in the latter at a predetermined distance from the end of the shroud serving for the bearing contact of the body or of the fixed part of the scroll.

BRIEF DESCRIPTION OF THE DRAWINGS

In any event, the invention will be understood clearly from the following description, with reference to the accompanying diagrammatic drawings which illustrate, by way of non-limiting example, a plurality of embodiments of a device for mounting and aligning the bearings of the crankshaft and of two scroll compressors.

DETAILED DESCRIPTION OF THE PREFERRED EMBODIMENTS

Figure 1:
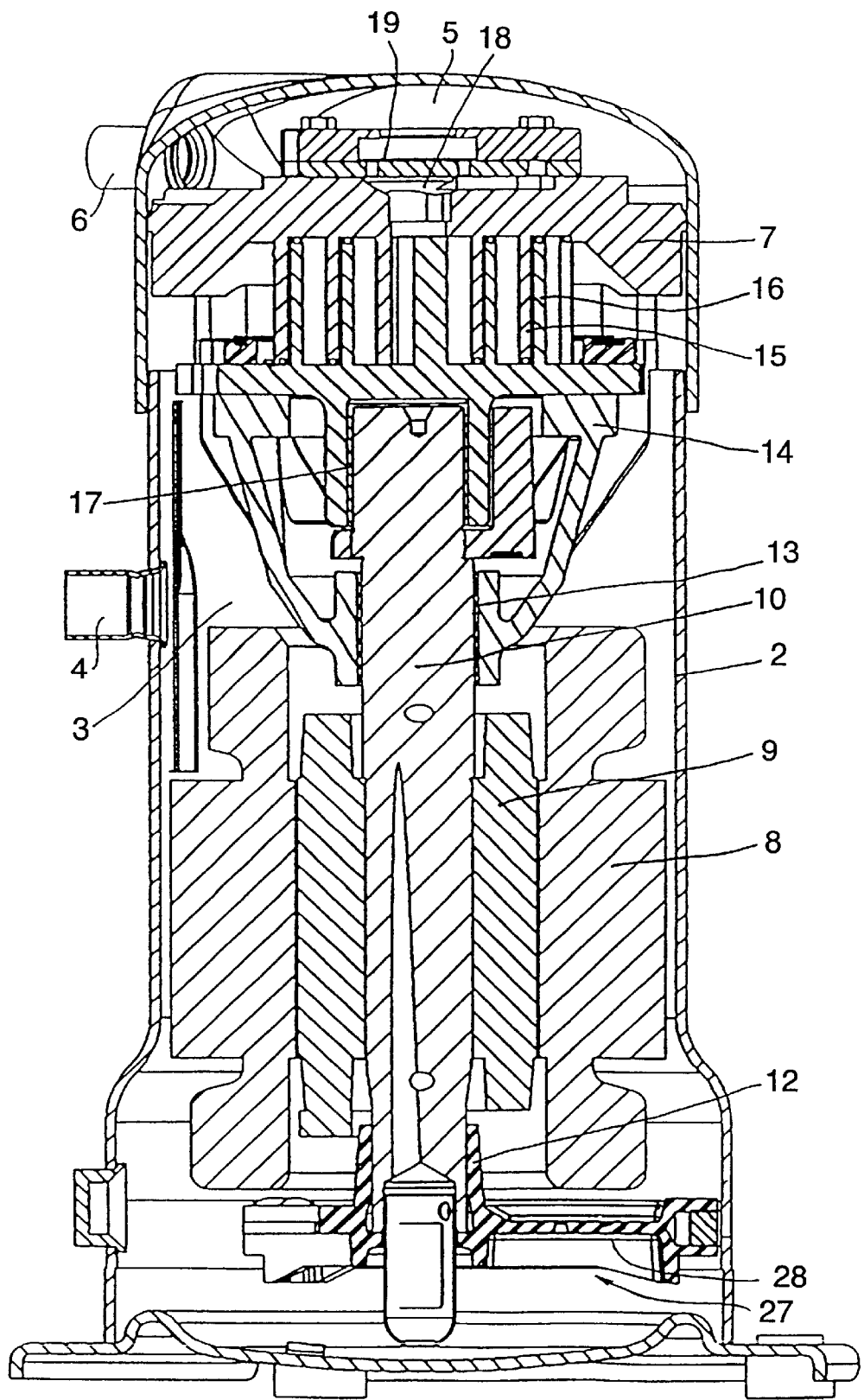
FIG. 1 is a view in longitudinal section of a scroll compressor.
Figure 2:
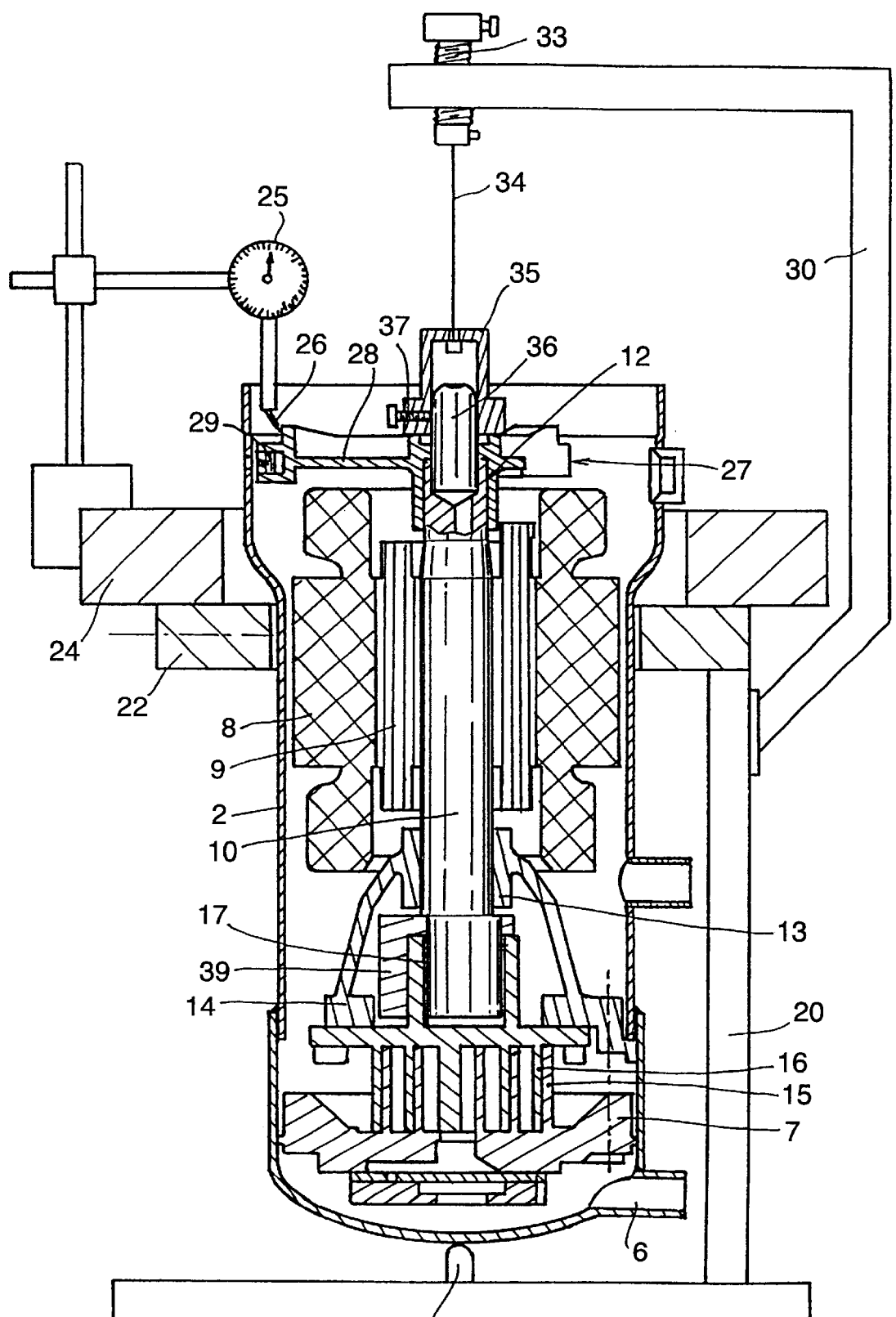
FIG. 2 is a view in longitudinal section of the scroll compressor of FIG. 1 positioned upside down and associated with a first device making it possible to align the bearings.
Figure 3:
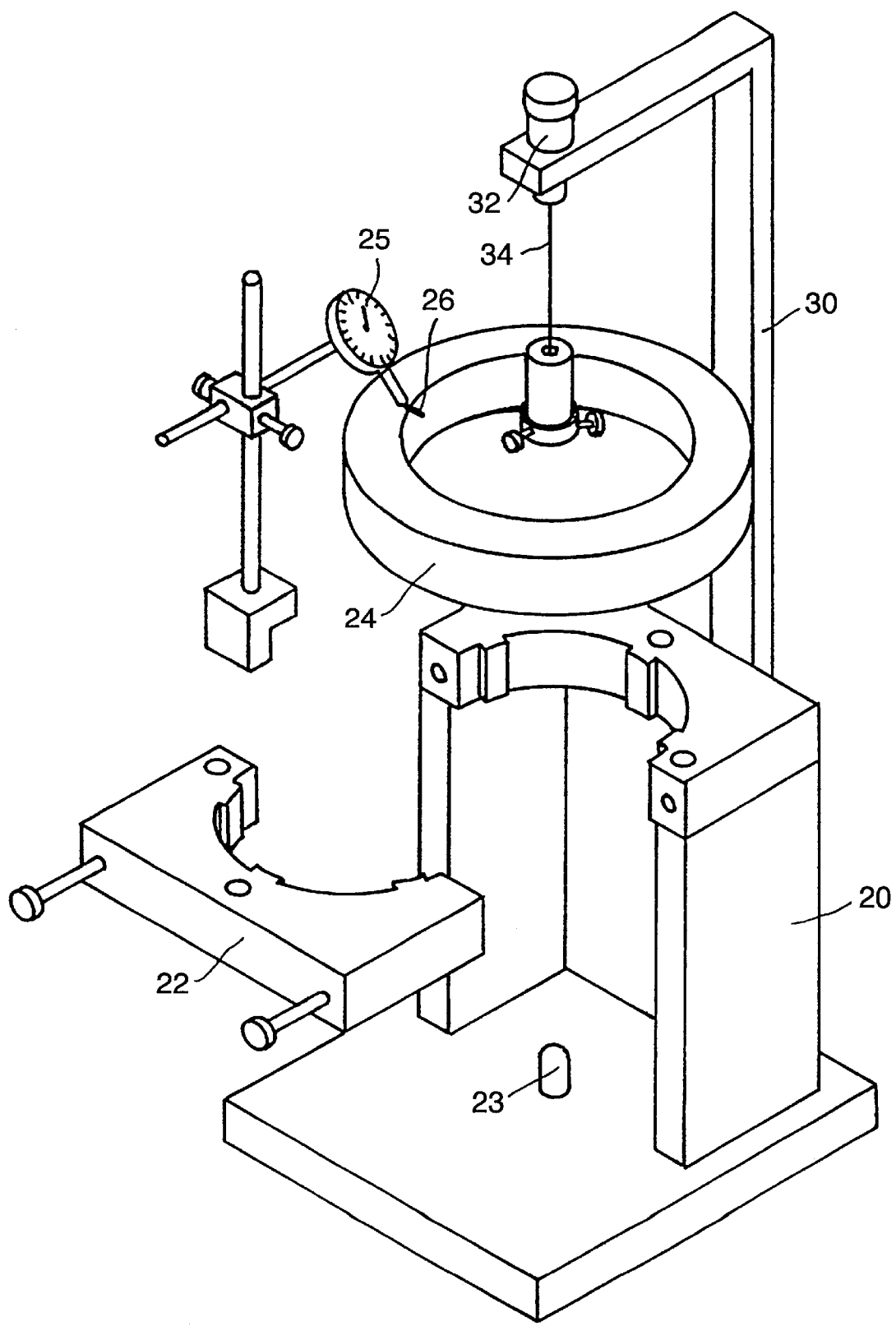
FIG. 3 is an exploded perspective view of the main components of the device for aligning the bearings shown in FIG. 2.
Figure 4:
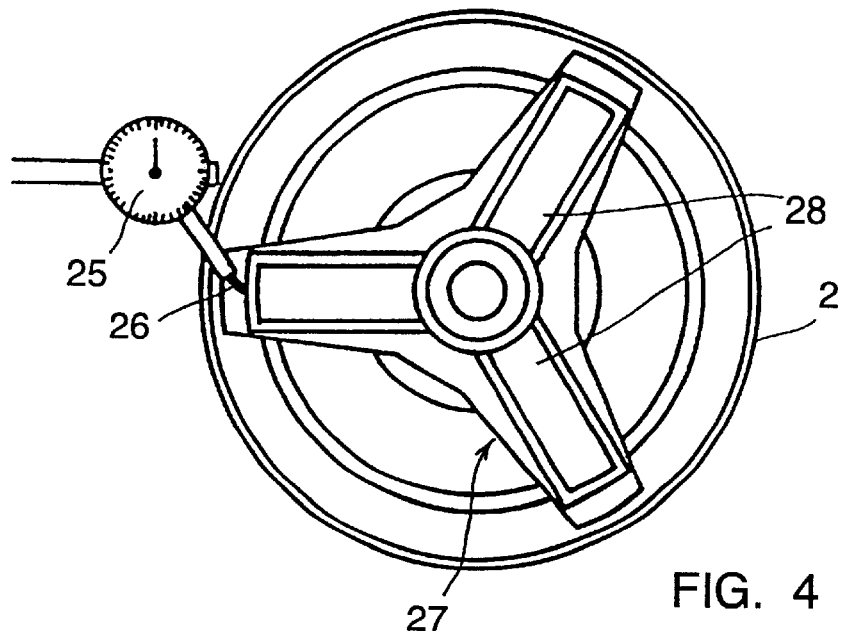
FIG. 4 is a top view during the measurement of the displacement of the crankshaft along the axis of one of the branches of the lower-bearing support.

FIGS. 2 to 6 illustrate a first device for aligning the bearings. After the motor has been mounted inside the casing of the body of the compressor and the cap has been welded to the shroud, the compressor is placed, upside down, in the device illustrated in FIG. 3. This device comprises a stand 20, the upper part of which is equipped with an opening girdle 22 and the pedestal of which has an outwardly projecting peg 23. The compressor is placed upside down, coming to bear against the peg and being held in the vertical position by the girdle 22. A ring 24 rests on the girdle 22, being accurately fastened thereto. This ring 24 serves for mounting a comparator 25 which is equipped with a feeler 26.

Engaged on the crankshaft 10 is the bearing 12 mounted inside a bearing support 27 comprising three branches 28 at 120° relative to one another. Each branch 28 is equipped at its free end with an internally threaded drillhole, into which a threaded stud 29 is engaged.

Fastened to the stand 20 is a scaffold, the free end of which is arranged in the axis of the crankshaft and above the latter. This scaffold is equipped with a thrust ball bearing 32, the vertical position of which can be adjusted by means of a thread 33. The thrust ball bearing is equipped with a cable 34, to the end of which is fastened a cap 35 intended to be engaged on the oil-pump tube 36 of the crankshaft, in order to carry out the fastening of the tube and consequently of the crankshaft with the aid of radial screws 37.

Figure 5:
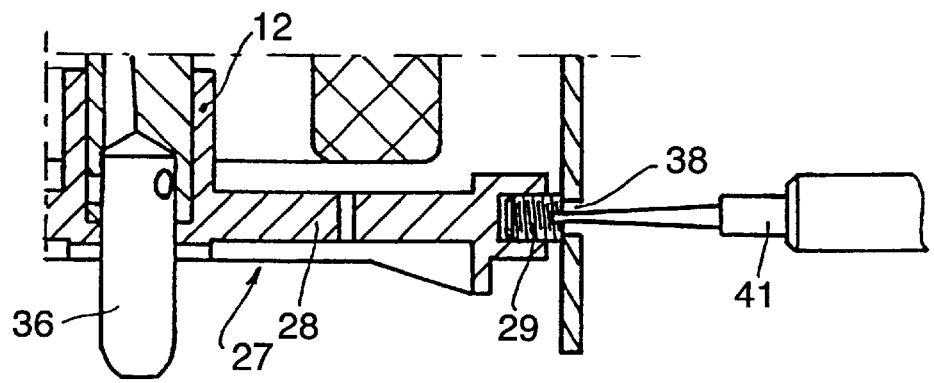
FIG. 5 is a view in longitudinal section illustrating the positioning of one of the branches of the lower-bearing support in relation to the casing of the compressor.
Figure 6:
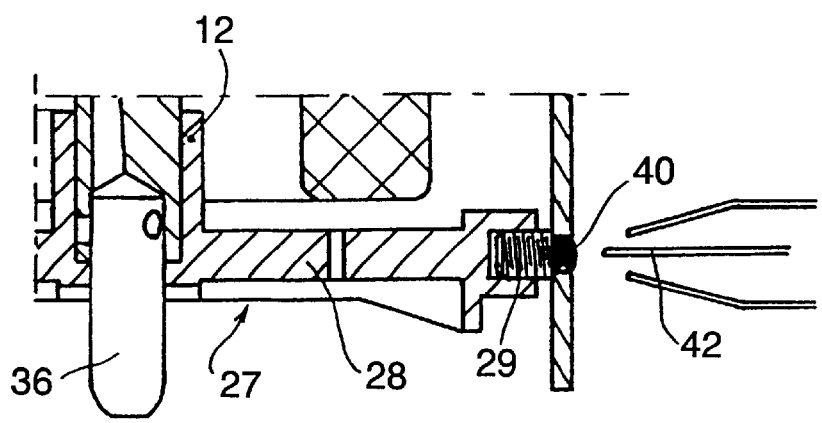
FIG. 6 is a view illustrating the locking of the same branch in position in relation to the casing.

In practice, after the cap 35 has been fastened to the oil-pump tube 36, the crankshaft is displaced vertically as a result of the screwing of the thrust ball bearing, in order to free the crankshaft from the bearing stresses and ensure the required axial plays, the studs 29 being screwed to the maximum and brought opposite corresponding holes 38 made in the casing. The crankshaft is positioned angularly, in such a way that the axis of symmetry of its counterweight 39 is perpendicular to one of the branches 28 of the bearing and on its left. The comparator 25 is put in place on the ring 24, in such a way that its feeler 26 comes to bear on this branch. A to-and-fro movement in the direction of this branch is imparted to the crankshaft. The comparator zero is located half-way along the displacement stroke of its needle. A similar procedure is subsequently adopted on the other two branches in order to determine half the stroke of these. The studs 29 are unscrewed with the aid of a screwdriver 41 so as to come to bear against the inner face of the casing and hold the bearing support 27 in a position corresponding to the intermediate position in the displacement of each of the three branches, as shown in FIG. 5. Once this positioning has been carried out, the lower-bearing support is fastened in this position by means of welds 40 made by means of a welding torch 42.

Figure 12:
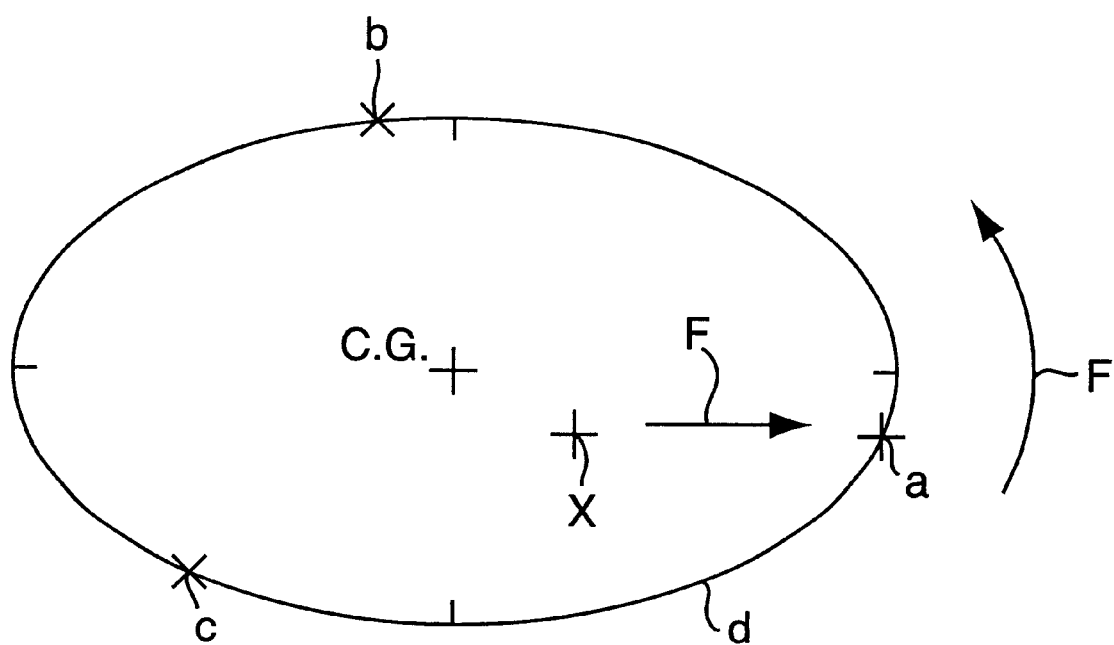
FIG. 12 schematically illustrates a path of movement for the crankshaft, the path being measured for use in properly orienting the crankshaft relative to a bearing.

As shown in FIG. 12 and according to a second possibility for aligning the crankshaft 10 relative to a bearing, the method comprises causing the crankshaft to inscribe a closed or quasi-closed curve by applying a radial force "F" rotating through 360° on the end of the crankshaft. This motion causes the crankshaft 10 to move from an initial position "X" before alignment to a position "a" where the crankshaft bears against the bearing mounted in the body. The crankshaft 10 is then rotated along an arcuate path as illustrated by points "b" and "c". The path of the crankshaft 10 is monitored and the center of gravity C.G. of the curve "d" traced by the crankshaft is then determined. The axis of the lower bearing is keyed on the center of gravity C.G. before fastening it to the casing.

Figure 7:
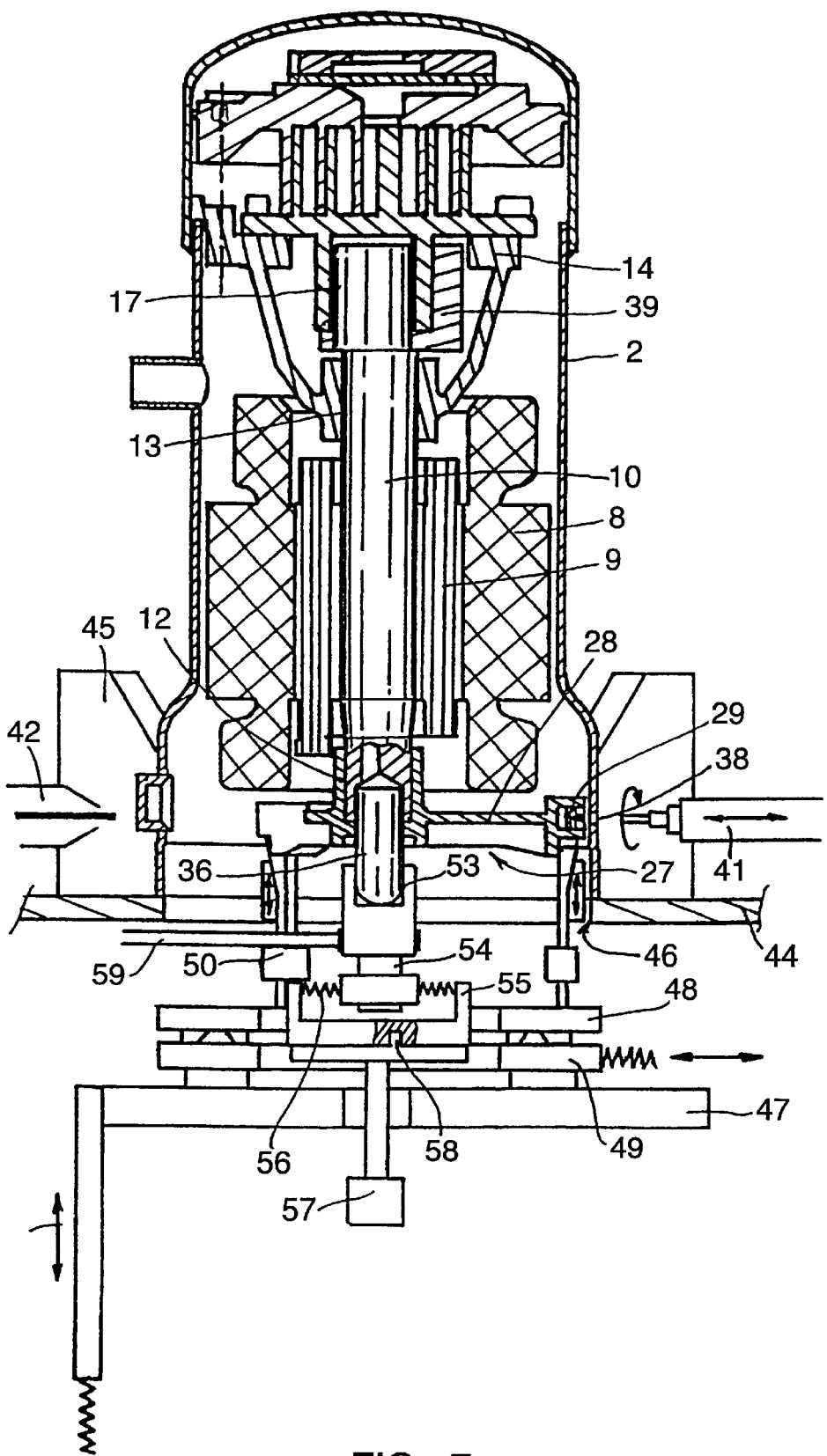
FIG. 7 is a view in longitudinal section of the compressor of FIG. 1 during the operation of aligning the bearings, the lower end of the crankshaft in this case facing downwards.
Figure 8:
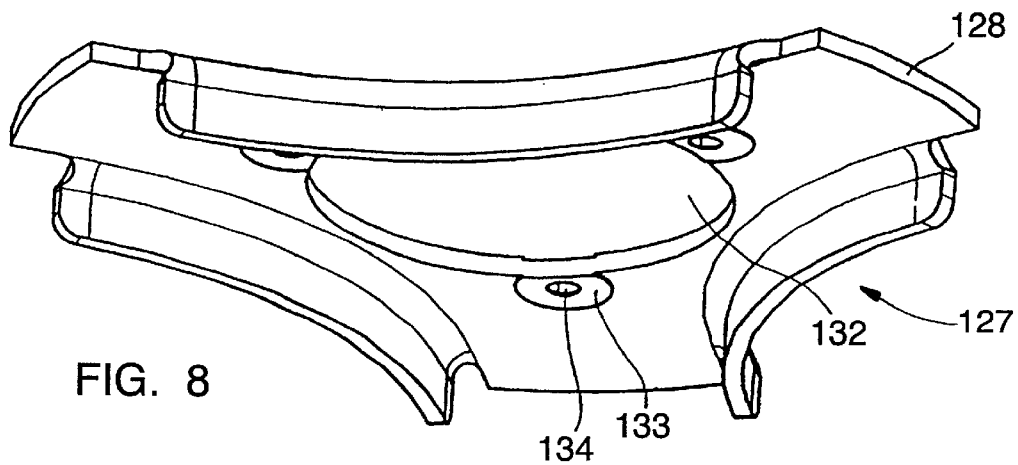
FIG. 8 is a perspective view of another bearing support.
Figure 9:
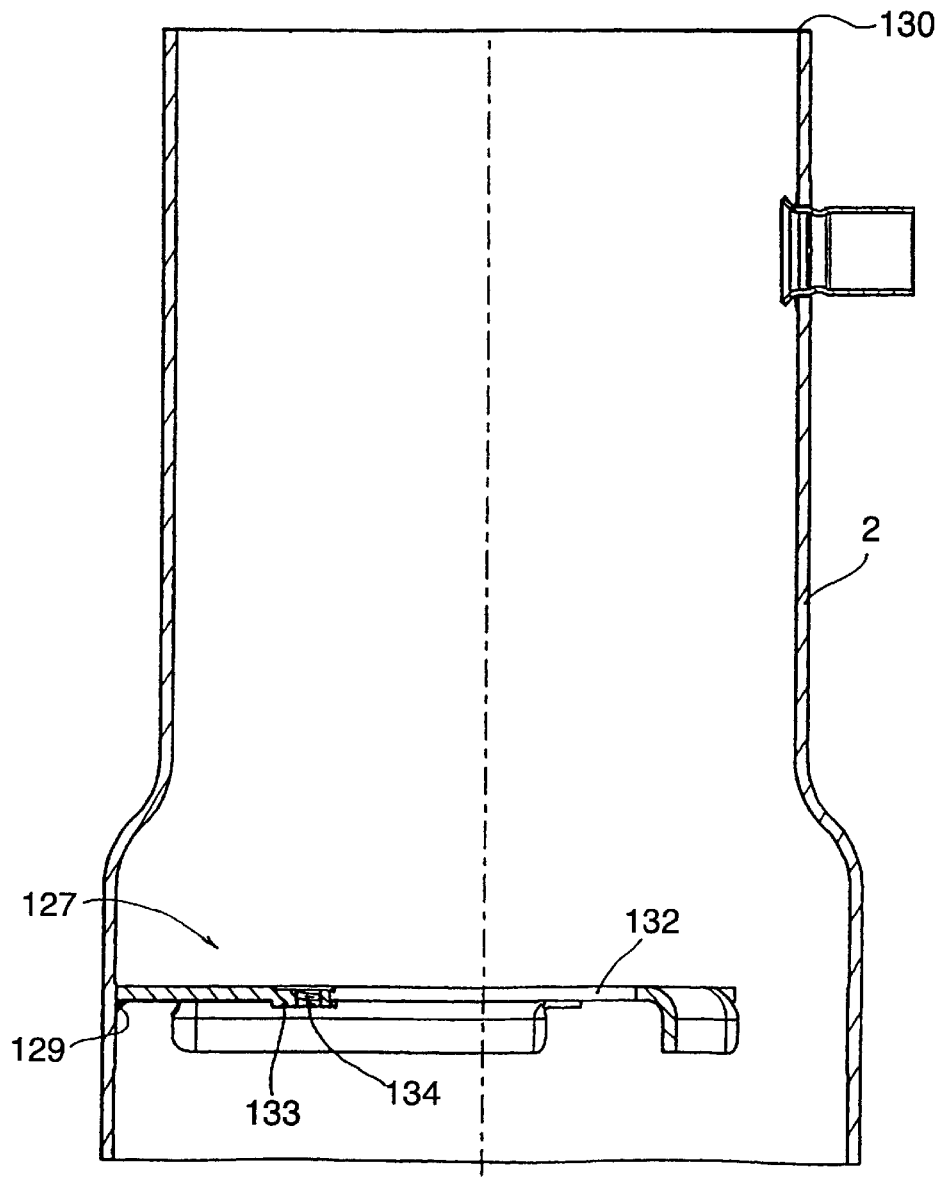
FIG. 9 is a view in longitudinal section of a compressor casing shroud, after the fastening of the support of FIG. 8.
Figure 10:
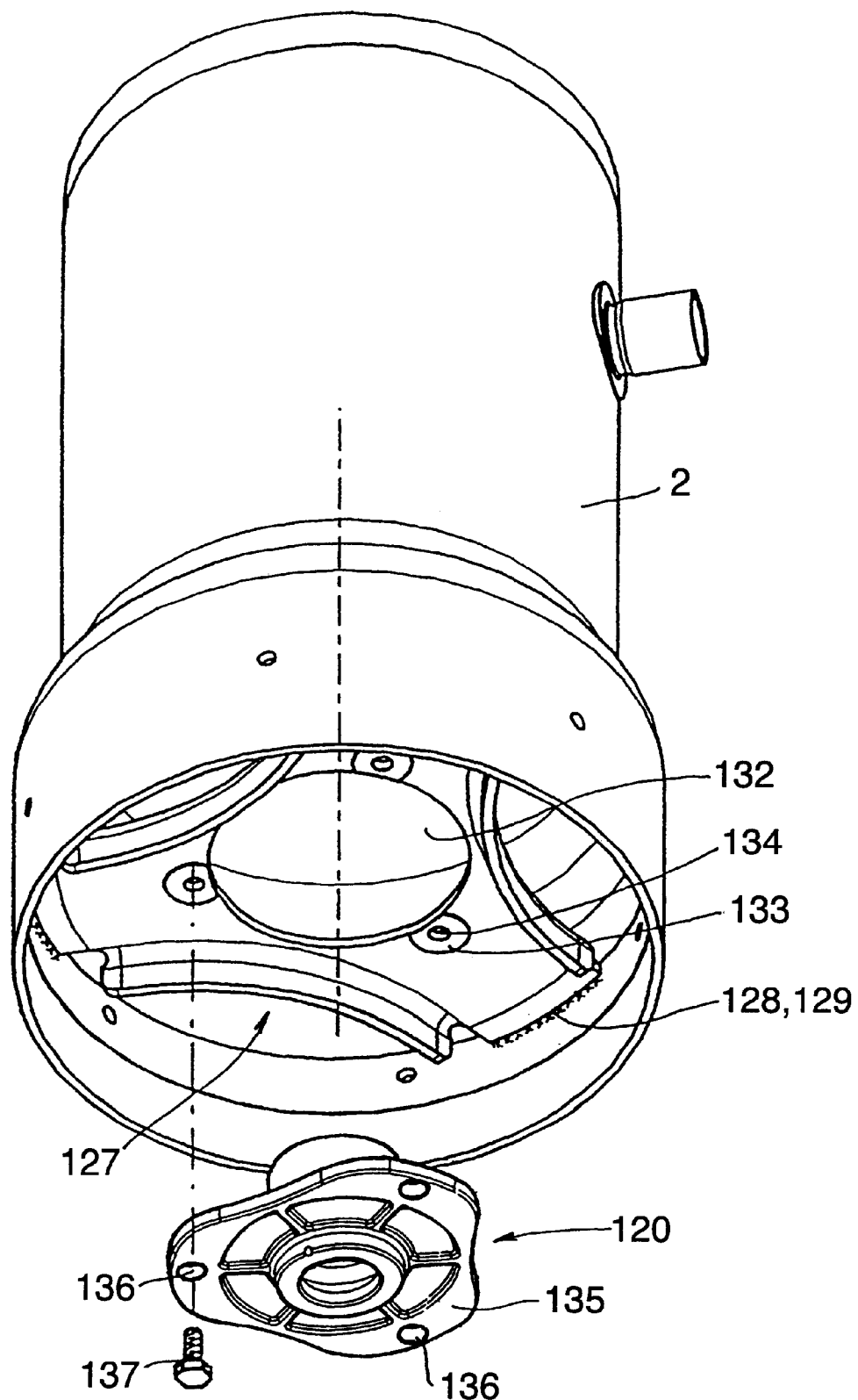
FIG. 10 is an exploded perspective view of a compressor, the casing of which is illustrated in FIG. 9.
Figure 11:
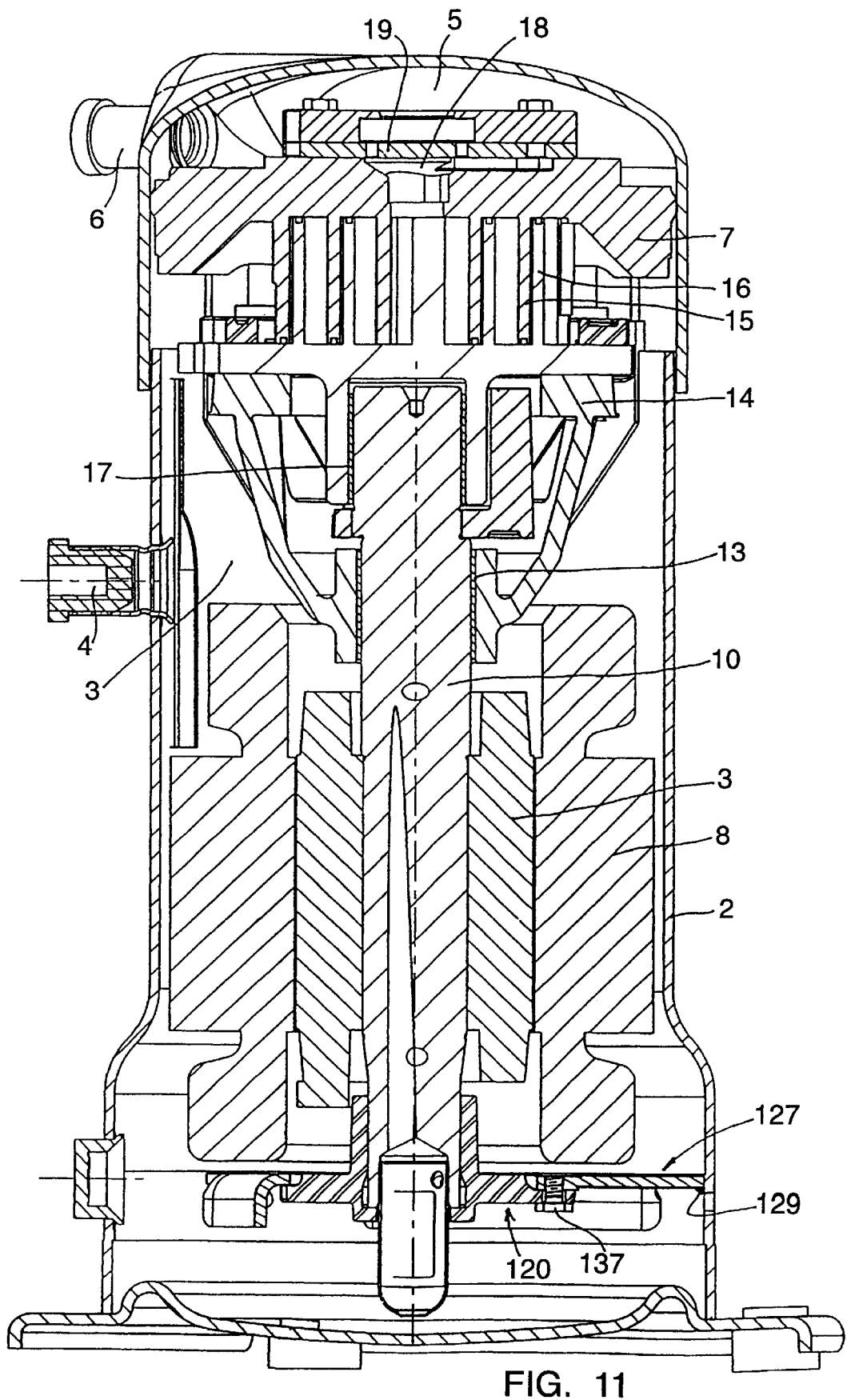
FIG. 11 is a view in longitudinal section of the compressor of FIG. 8 after the alignment and fastening of the lower bearing.

FIG. 7 illustrates a second device, in which the same elements are designated by the same references as before. In this case, the alignment of the bearings is carried out with the free end of the crankshaft facing downwards.

This device comprises a plate 44 intended for serving as a support for the lower edge of the casing of the compressor, the said lower edge being positioned by means of centering elements 45 located opposite an orifice 46 made in the plate. Below the plate and opposite the orifice in the latter is arranged a support 47, on which is mounted a table comprising two superposed plates 48 and 49 capable of being displaced respectively in two approximately perpendicular directions. Mounted on the upper plate 48 are arms 50 for fastening the branches 28 of the crankshaft bearing support. The vertical position of the support 47 can be set by means of a mechanism indicated diagrammatically by the reference 52.

The device according to the invention also comprises a cap intended for clamping the oil-pump tube 36 of the crankshaft and mounted at one end of a shaft, the other end of which can be driven in an orbital movement.

Furthermore, this device comprises a motor 57 driving in an orbital movement a piece 55 in the general shape of a bowl, in which are mounted, with radial springs 56 interposed, the lower end of the shaft 54 equipped with the cap 53 for holding the free end of the crankshaft 10 and a mechanism 59 for driving in rotation the cap 53 for holding the free end of the crankshaft 10.

Once the axis of the bearing has been determined, the procedure described above is adopted, whereby the studs 29 are released in order to bring them into contact with the inner face of the casing, before fastening by welding is carried out.

This technique implemented with the vertical compressor may also be implemented with the compressor in another position, for example horizontal.

FIGS. 8 to 11 illustrate another embodiment of the method according to the invention. In this embodiment, the same elements are designated by the same references as before.

In this case, the compressor is intended to be equipped with a support 127 for the lower bearing 120 of the crankshaft.

In the embodiment illustrated in the drawing, the support 127 comprises three branches, of which the ends in the form of circular surface portions 128 are intended to come to bear with a suitable fit against the interior of the shroud, for the purpose of fastening by means of welds 129. This support 127 is fastened parallel to the end 130 of the shroud on which the body of the compressor or the fixed part of the scroll is intended to come to bear. In the embodiment illustrated, the support comprises three branches, but it could have a different shape and possess a number of different bearing points against the shroud, the essential factor being that there are orifices for the passage of the oil and gas. Thus, for example, the support could be ring-shaped and bear over its entire periphery against the shroud. Likewise, fastening could be carried out not by welding, but by press mounting, with the holding position simply being secured by resistance welding. If the piece is made of cast iron, it will be possible to carry out fitted mounting and ensure blocking by a laser weld or mechanical deformation.

The support 127 comprises a central orifice 132 for the passage of the rotor and for the passage of the tool which can be used for making the weld 129. On its lower face, the support 127 comprises three plane bosses 133, in the centre of each of which an internally threaded duct 134 opens out. After the support 127 has been fastened in the shroud, the support forms the vertical reference for the bearing. The bearing 120 comprises, in turn, a ring 135 intended to come to bear against the bosses 133 which form a reference plane. In the ring 135 are made three holes 136 arranged according to the same angular distribution as the holes 134 of the support, but having a diameter greater than the diameter of the holes 134. The alignment of the bearing mounted on the crankshaft is carried out in the way indicated above, and, after this alignment, the blocking of the bearing with respect to the support 127 is carried out by the tightening of screws 137 which pass through the holes 136 and are blocked by screwing in the internally threaded holes 134 of the support. This fastening could be different and be carried out, for example, by welding, inasmuch as the ring of the bearing and the support are both made from steel.

This last technique is expedient inasmuch as it makes it possible to dissociate the axial positioning of the bearing as a result of the previous fastening of the support from the alignment of the bearing which is carried out, as indicated above, with the bearing being blocked with respect to the support after the alignment has been carried out.

What is claimed is:

1. A method for mounting and aligning upper and lower bearings for supporting a crankshaft of a scroll compressor, using a single stand, the method comprising the steps of:

providing a single bearing mounting and alignment fixture having measuring apparatus associated therewith for determining bearing play, providing a compressor assembly formed by mounting a body forming part of the compressor and compression elements in a casing forming part of the compressor, with a body or fixed scroll bearing on one end of a shroud defined by the casing, and then welding a cap to the shroud, the crankshaft being previously or subsequently engaged in a movable scroll bearing forming part of a movable portion of a compression stage in the compressor and into the upper bearing coupled to the body, the crankshaft having to be mounted in a lower bearing, itself mounted in a support to be fastened to the casing of the compressor, mounting the compressor assembly in the single bearing mounting and alignment fixture, displacing a free end of the crankshaft in a plurality of directions approximately perpendicular to an axis defined by the crankshaft to account for play in the upper bearing mounted in the body, using the measuring apparatus to determine the play in the upper bearing and then determining the axis of the lower bearing from the different displacements of the crankshaft, positioning the lower bearing as a function of the axis of the lower bearing, and fastening the support equipped with the lower bearing to the casing of the compressor.

2. A method according to claim 1, wherein the step of fastening the support includes fastening the support to the casing and then fastening the lower bearing to the support.

3. A method according to claim 1, wherein the compressor includes a fixed and a moveable volute defining sealing lines therebetween, the sealing lines being approximately parallel to a longitudinal axis defined by the crankshaft, and wherein the step of displacing a free end of the crankshaft includes:

displacing the crankshaft in a plane approximately perpendicular to two approximately parallel planes delimited by the sealing lines.

4. A method according claim 1, wherein the step of fastening the support to the shroud is carried out by welding.

5. A method according to claim 1, wherein the support of the bearing comprises at least three radial branches.

6. A method according to claim 1, wherein when the compressor is positioned approximately vertically "upside down", the method includes the steps of engaging the lower bearing on the crankshaft, exerting a pull on the crankshaft in order to suspend it, by a predetermined value, positioning a measuring device fastened to a fixed part of the compressor, bringing the measuring device to bear against the bearing or a piece integral therewith, the compressor including a counterweight having an axis of symmetry approximately perpendicular to a first direction of radial displacement of the bearing, determining the middle of the stroke in this direction by imparting a to-and-fro movement to the crankshaft, carrying out the same operation in at least one other direction, the axis of the bearing being obtained by taking into account half the axial stroke along the various directions of displacement.

7. A method according to claim 6, wherein the compressor is positioned vertically "upside down", the method comprising the steps of engaging on the crankshaft the lower bearing mounted within a support with at least three radial branches, exerting a pull on the crankshaft in order to suspend it, by a predetermined value, positioning a measuring device, such as a comparator, opposite the first branch, the compressor including a counterweight having an axis of symmetry approximately perpendicular to this branch, determining the middle of the axial stroke of this branch by imparting a to-and-fro movement to the crankshaft in the direction of the stroke, then carrying out the same operation on the other branches, the axis of the bearing being obtained by taking into account half the axial stroke along the various branches.

8. A method according to claim 1, wherein the step of displacing a free end of the crankshaft includes causing the crankshaft to inscribe a closed or quasi-closed curve by applying a radial force rotating through 360° on the free end of the crankshaft thereby causing the crankshaft to come to bear against the bearing mounted in the body, determining the centre of gravity of the curve and keying the axis of the lower bearing on this point before fastening to the casing.

9. A method according to claim 8, including the step of causing the crankshaft to rotate about its axis at the same time as the radial force rotating through 360° is applied.

10. A method according to claim 1, wherein before displacing the crankshaft in order to determine the axis of the lower bearing, the method includes the step of engaging on the free end a bearing mounted in a support, the support being mounted with radial play in the shroud with the possibility of being fastened to the shroud.

11. A method according to claim 10, wherein the support of the bearing is equipped with at least three radially adjustable radial studs or supports intended to come to bear against the inner face of the shroud in order to carry out the positioning of the support and of the bearing in the alignment position.

12. A method according to claim 11, wherein the radial adjustment of the studs is carried out by screwing, the studs being immobilizable via a quick-setting glue.

13. A method according to claim 1, further comprising determining the axis of the lower bearing by the displacement of the free end of the crankshaft in a plurality of directions approximately perpendicular to its axis, then engaging on the free end of the crankshaft a bearing mounted in a support, itself mounted with radial play in the shroud the support being fastenable to the shroud.

14. A method according to claim 1, comprising the steps of fastening the support of the bearing in the casing of the compressor by taking into account the desired distance between an end of the shroud serving for the bearing contact of the body and the support, then, after mounting in the casing of the compressor the various component elements of the latter, carrying out the alignment of the lower bearing with the scroll bearing by displacing the lower bearing within an orifice of larger area which the support comprises, and, after carrying out this alignment, fastening the lower bearing to the support.

15. A method according to claim 14, comprising causing the bearing to come to bear on its support by means of a ring-shaped part of the bearing coming to bear on bosses formed on a lower face of a support.

16. A method according to claim 14, further including the steps of carrying out the fastening of the bearing to its support by screwing, the support comprising internally threaded holes and the bearing comprising holes or slots having the same angular distribution as the internally threaded holes of the support, but having a larger cross section, to allow the passage of the screws, the lower bearing being laterally adjustable relative to the support, in order to carry out the alignment of the lower bearing with the upper bearing.

17. A device for carrying out the method of claim 1, further comprising:

a stand for receiving the compressor, and a mechanism for holding the free end of the crankshaft.

18. A device according to claim 17, further comprising:

a stand for receiving the compressor "upside down" in the vertical position, a ring fastenable to the stand and for fastening a comparator thereon for measuring the displacements of the crankshaft successively along the axes of the three branches of the bearing support, and a scaffold fixed to the stand and having end equipped with a thrust ball bearing said end having a cable attached thereto at one end for carrying a cap for fastening an oil-pump tube mounted on the end of the crankshaft.

19. A device according to claim 17, comprising:

a stand for receiving the compressor, the free end of the crankshaft facing outwards, a table arranged at the end of the stand and comprising two approximately parallel plates associated with means for displacement and for measuring the displacement in two perpendicular directions, pieces fixed to the plate nearest the compressor for fastening branches of the support of the lower bearing, and a cap for holding the free end of the crankshaft, the cap being drivable in a longitudinal movement in order to set the axial position of the crankshaft.

20. A device according to claim 19, wherein the cap for holding the free end of the crankshaft is mounted on one end of a shaft, the other end of which can be driven in an orbital movement.

21. A device according to claim 20, further comprising a motor for driving in an orbital movement a generally bowl-shaped piece, in which is mounted, with radial springs interposed, the lower end of the shaft equipped with the cap for holding the free end of the crankshaft.

22. A device according to claim 20, further comprising a mechanism for driving in rotation the cap for holding the free end of the crankshaft.

23. A scroll compressor, comprising a casing consisting of a shroud, within which are mounted a body of the compressor and compression elements, with the body or the fixed part of a scroll bearing on one end of the shroud before closing by welding a cap, a crankshaft which drives the movable part of the scroll being engaged in a movable scroll bearing belonging to the movable part of the compression stage, in an upper bearing belonging to the body and in a lower bearing, the lower bearing being equipped with means for setting its alignment with the upper bearing belonging to the body, said means becoming part of and remaining with the scroll compressor after the lower bearing is aligned with the upper bearing.

24. A scroll compressor according to claim 23, wherein the lower bearing is mounted in a support, and the support is mounted with radial play in the shroud of the casing and is equipped with means for positioning.

25. A scroll compressor according to claim 23, wherein the lower bearing is mounted with radial play in a support, with blocking on the scroll in the alignment position, the support being sized to fit in the interior of the shroud of the casing and being fastened in the shroud at a predetermined distance from the end of the shroud serving for the lower bearing contact of the body or of the fixed part of the scroll.

* * * * *